(12) United States Patent
Letzer et al.

(10) Patent No.: US 8,062,135 B2
(45) Date of Patent: Nov. 22, 2011

(54) DUAL-MASS FLYWHEEL HAVING RADIALLY ARRANGED WIRE CUSHION BODIES

(75) Inventors: Michael Letzer, Wasserburg (DE); Ekkehard Gorski, Murnau (DE); Werner Kroeger, Oberschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/904,743

(22) Filed: Oct. 14, 2010

(65) Prior Publication Data
US 2011/0028223 A1  Feb. 3, 2011

Related U.S. Application Data

(63) Continuation of application No. PCT/EP2009/003469, filed on May 15, 2009.

(30) Foreign Application Priority Data

Jun. 6, 2008 (DE) .......................... 10 2008 027 203

(51) Int. Cl.
*F16F 15/121* (2006.01)
(52) U.S. Cl. ........................................ 464/9; 464/68.91
(58) Field of Classification Search .................. 464/67.1, 464/68.9–68.92, 7, 9, 16, 82, 8; 192/207, 192/212; 267/166, 179
See application file for complete search history.

(56) References Cited

U.S. PATENT DOCUMENTS

| 2,838,267 | A | * | 6/1958 | Wells |
| 4,690,659 | A | * | 9/1987 | Marchisio et al. ........ 192/207 X |
| 5,218,884 | A | * | 6/1993 | Rohrle ..................... 464/67.1 X |
| 6,712,706 | B2 | * | 3/2004 | Jackel et al. |

FOREIGN PATENT DOCUMENTS

| CH | 392 279 | 5/1965 |
| DE | 199 10 919 A1 | 9/2000 |
| DE | 10 2007 003 047 A1 | 8/2007 |
| DE | 10 2008 011 725 A1 | 9/2008 |
| FR | 1.495.611 | 9/1967 |

OTHER PUBLICATIONS

International Search Report dated Aug. 25, 2009 including English translation (Six (6) pages).

* cited by examiner

*Primary Examiner* — Gregory Binda
(74) *Attorney, Agent, or Firm* — Crowell & Moring LLP

(57) ABSTRACT

A dual-mass flywheel has a first mass body and a second mass body which can rotate relative to one another by way of a damping device disposed between the first mass body and the second mass body. The damping device includes, running in the shape of an arc, at least one helical compression spring, which introduces spring force into the mass bodies via contact surfaces formed on the first mass body and the second mass body. The helical compression spring is guided in the radial direction by a wall formed by a mass body. At least one friction-reducing sliding component in the form of a wire cushion body is provided between the wall and the helical compression spring.

16 Claims, 1 Drawing Sheet

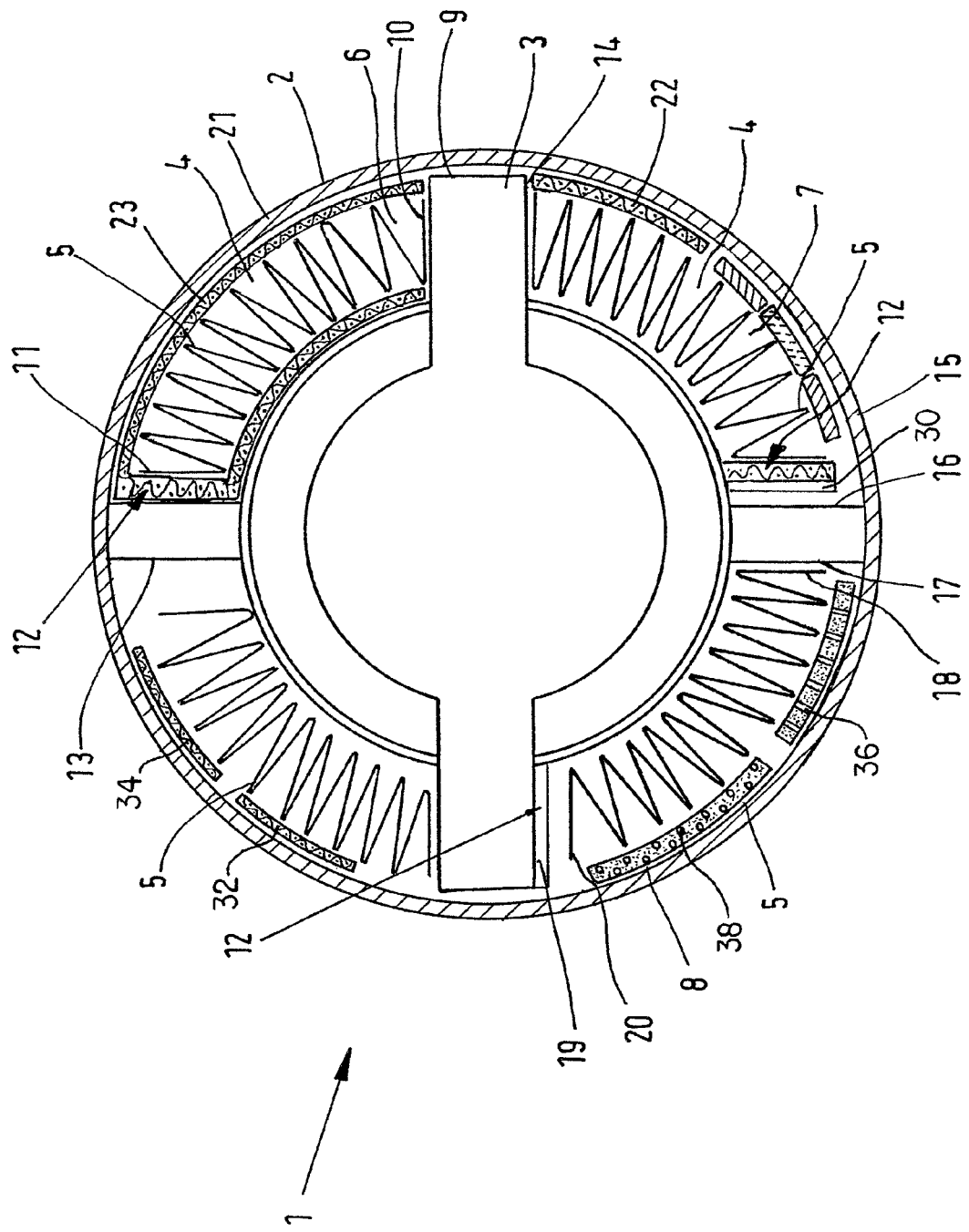

DUAL-MASS FLYWHEEL HAVING RADIALLY ARRANGED WIRE CUSHION BODIES

CROSS-REFERENCE TO RELATED APPLICATIONS

This application is a continuation of PCT International Application No. PCT/EP2009/003469, filed May 15, 2009, which claims priority under 35 U.S.C. §119 from German Patent Application No. DE 10 2008 027 203.5, filed Jun. 6, 2008, the entire disclosures of which are herein expressly incorporated by reference.

BACKGROUND AND SUMMARY OF THE INVENTION

The present invention relates to a dual-mass flywheel having a first mass body and a second mass body which can rotate relative to one another by way of a damping device disposed between the first mass body and the second mass body. The damping device includes, running in the shape of an arc, at least one helical compression spring which introduces spring force into the mass bodies via contact surfaces formed on the first mass body and the second mass body. The helical compression spring is guided in the radial direction by a wall formed by a mass body. Between the wall and the helical compression spring at least one friction-reducing sliding component is provided.

A dual-mass flywheel according to this type can be used in the drive train of a motor vehicle. The drive train includes a motor, transmission, and vehicle so that the excitation of vibration by the motor also acts on the other components of the drive. In order to improve the vibration behavior and thus also the noise behavior of the drive train, dual-mass flywheels are used, which include a primary mass or a first mass body which, for example, can be rigidly connected to the crankshaft of the motor and a secondary mass or a second mass body which can rotate relative to the first mass body. The first and second mass bodies are connected to one another in a rotationally elastic manner via a damping device.

A dual-mass flywheel according to this type has been disclosed, e.g., based on DE 10 2007 003 047 A1. The mass body of this known dual-mass flywheel is supported via helical compression springs and, in fact, via contact surfaces provided on the mass bodies.

This known dual-mass flywheel is formed so that the sheet metal parts forming the receiving chamber for the helical compression springs are formed with low wall thicknesses to reduce weight and the helical compression springs are supported against the sheet metal parts via sliding shoes. The introduction of compressive forces into the sheet metal parts is done via impact components formed in the manner of a flange. Via the sliding shoes between the helical compression springs and the sheet metal parts, the result is supposed to be achieved that the spring ends do not dig through the sheet metal parts.

In other words, this means that additional parts are present in the form of the sliding shoes. The additional parts are intended to ensure that the friction between the helical compression spring and a wall guiding the helical compression spring is reduced. The helical compression springs are namely massive parts which at high angular speed of the dual-mass flywheel are pressed against the wall with great centrifugal force.

Due to the great centrifugal force, lubricants present in the channel guiding the helical compression spring are pressed out of the contact area between the helical compression spring and the wall, which leads to the result that the friction between the wall and the helical compression spring increases so much that the helical compression spring behaves as a rigid body element and thus the desired acoustic decoupling between the drive motor and the drive train of the vehicle is no longer present.

The sliding shoes present in the known dual-mass flywheel described above are made of a plastic material, which due to the relative movement between the helical compression spring and the wall is, so to speak, rubbed to pieces and thus can no longer exercise its function of reducing friction. The plurality of sliding shoes present in the known dual-mass flywheel also leads to a significant and undesirable increase in cost of the dual-mass flywheel.

In view of the above, there is therefore needed a dual-mass flywheel of the above type such that its function of reducing friction between the helical compression spring and the wall is maintained even for a longer operating period and thus the acoustic decoupling between the motor and the drive train is retained.

This need is met according to the invention by providing a dual-mass flywheel with a first mass body and a second mass body which can rotate relative to one another via a damping device disposed between the first mass body and the second mass body. The damping device includes, extending in the shape of an arc (curved), at least one helical compression spring which introduces spring force into the mass bodies via contact surfaces formed on the first mass body and the second mass body. The helical compression spring is guided in the radial direction by a wall formed by one mass body. Between the wall and the helical compression spring, at least one friction-reducing sliding component is provided, where a wire cushion body is provided as a sliding component.

With this dual-mass flywheel, a configuration is created which is substantially more stress-resistant than the plastic sliding shoes of the known dual-mass flywheels described above which are made of a plastic material. The helical compression spring under centrifugal force no longer directly abuts the wall but rather with the interposition of a wire cushion body, at least in sections along the longitudinal direction of the helical compression spring.

The wire cushion body has a spring action which, depending on in which direction it is packed more or less densely, can be configured differently. Thus, the wire cushion body can be formed to be elastic in the longitudinal direction and/or in the radial direction of the helical compression spring. The wire cushion body has cavities in which lubricants in the form of grease or the like can be embedded.

Due to the spring action of the wire cushion body it is, under the load of centrifugal force on the helical compression spring, in fact compressed in the radial direction relative to the longitudinal axis of the dual-mass flywheel but, with an appropriately chosen rigidity of the wire cushion body, the cavities are preserved in the radial direction and thus also the lubricants present between the wire cushion body and the wall of the dual-mass flywheel. Due to the laminar abutment of the wire cushion body against the wall, the contact pressure per unit area between the wire cushion body and the wall is significantly less than the contact pressure per unit area between the coils of the helical compression spring and the wall when the helical compression spring abuts the wall directly.

Care must also be taken when forming the wire cushion body that lubricants are embedded in the matrix of the wire cushion body which, even at a high angular speed of the dual-mass flywheel, remain present in the area of contact between the wire cushion body and the wall and thus retain their friction-reducing action even for longer periods of operation of the dual-mass flywheel according to the invention.

The wire cushion body can, for example, be a body formed of knitted wire fabric, where the body is compressed in a mold by a pressing process. Along with this, the wire cushion body can also be formed by a wound body which is wound in layers on a shaft or a spool. Before the wire in this case is subjected to the winding process, it is subjected, at least within partial segments or sections along its length, to a preliminary deformation, which leads to the result that the individual wire sections within the layers and also between the layers intertangle with one another significantly better and more intensively than is the case with wire which has not been deformed. This leads to a wire cushion body which is significantly more stress-resistant than a wire cushion body made of wire which has not been deformed.

In connection with this, it is provided according to an extension of the invention that the wire cushion body is formed to be elastic in the longitudinal direction and/or in the radial direction of the helical compression spring. Depending on how densely the wire cushion body is packed in the radial direction, it is possible to achieve rigidity of the wire cushion body in its radial direction. With this, for example, a configuration is possible in which the relative movement between the spring and the wire cushion body is greater than the relative movement between the wire cushion body and the wall of the dual-mass flywheel.

The wire cushion body can also be formed to be elastic in the longitudinal direction of the helical compression spring so that in a spring movement of the helical compression spring, e.g., in the radially inward-lying area of contact between the helical compression spring and the wire cushion body, the spring movement is reproduced, taken up so to speak, by the wire cushion body in the radially outward-lying area between the wire cushion body and the wall of the dual-mass flywheel, but a relative movement no longer takes place or takes place only to a slight degree.

In such a configuration, care is therefore taken that the helical compression springs can move almost freely and thus hardening of the helical compression springs is avoided and thus the desired acoustic decoupling is retained.

According to one embodiment of the present invention, it is provided that the wire cushion body is disposed as an elongated insert between at least one partial area of the length of the helical compression spring and the wall. In other words, this means that it can even be sufficient if the wire cushion body only separates partial areas of the length of the helical compression spring and the wall from one another. However, an arrangement of the wire cushion body as an insert between the helical compression spring and the wall and along the entire length of the helical compression spring running in the shape of an arc is provided according to the invention.

According to a different embodiment of the present invention, it is provided that the wire cushion body is formed as a mantle which envelopes the helical compression spring, at least along a partial area of its length. With this the helical compression spring, so to speak, plugs into the wire cushion body formed as a mantle and in fact at least at partial areas of its length. However, a complete envelopment of the helical compression spring along its entire length by the wire cushion body in the form of a mantle is also provided according to the present invention.

According to an extension of the invention, it is provided that the wire cushion body includes, in the area of one end facing a contact surface, a wire cushion counterbearing body formed as one piece with the wire cushion body or disposed thereon. The wire cushion counterbearing body is provided between one spring end of the helical compression spring and the contact surface. An introduction of spring force into the contact surface takes place via the wire cushion counterbearing body.

The wire cushion counterbearing body can therefore, for example, be inlaid at the end of the wire cushion body or also can be formed together with the wire cushion body during the manufacture of the wire cushion body. The wire cushion counterbearing body then leads to a reduction of wear of the contact surface on the dual-mass flywheel and thus to an extension of the service lifetime of the dual-mass flywheel.

It is also possible in this way to reduce the contact surface since the wire cushion body, unlike the spring end of the helical compression spring, lies over the surface of the contact surface and thus the contact pressure per unit area of the contact surface is reduced. This can also be utilized to reduce the contact surface, whereby a reduction of the dimensions of the components is made possible and thus an advantage in weight is achieved.

The wire cushion counterbearing body can also be provided at a distance from the spring end or from the contact surface so that initially a relatively free mobility of the helical compression springs is achieved and only after a predetermined excursion of the spring is contact between the spring end of the helical compression spring and the wire cushion counterbearing body reached. In general, an improved insulation against vibration can be achieved with the wire cushion counterbearing body between the spring end and the contact surface and thus an improvement of the acoustic behavior of the dual-mass flywheel according to the invention with respect to the known dual-mass flywheel.

According to an extension of the invention, it is provided that the wire cushion body is formed by at least two wire cushion segment bodies which are disposed functionally in a row or in parallel.

Through the connection in a row a soft configuration of the wire cushion body is achieved while through the connection in parallel a wire cushion body can be formed which has a spring characteristic with greater rigidity and thus a harder wire cushion body, depending on which configuration is desired for a given application.

According to an extension of the invention, it is also provided that the wire cushion body is formed along its direction of action with a linear or progressively or regressively variable spring rate. Such a configuration with a variable spring rate can, for example, be achieved in the manufacture of the wire cushion body by forming the wire cushion body with a predetermined number of cavities, which leads to the number of cavities corresponding to a softer or harder configuration. A progressive spring rate can, for example, be of advantage when, depending on the spring excursion of the wire cushion body, flexible behavior is desired initially in order to achieve, after a predetermined spring excursion, an increase of the spring characteristic and thus a harder behavior of the wire cushion body.

The wire cushion body can be formed of metallic, ceramic, or vitreous materials, of polymers, or of mixtures thereof. Also, the wire cushion body can be formed of metallic materials of different hardness. With this a configuration is made possible in which the wire cushion body has a first contact area of a soft metallic material which is then followed by a second contact area of a harder metallic material, whereby, for example, a configuration deviating from a linear spring rate is possible.

The wire cushion body provided according to the invention in the dual-mass flywheel can have cavities in which a lubricant is embedded. It can also have embedded solid lubricant parts, each of which provides that the friction between the wire cushion body and the wall of the dual-mass flywheel remains low and thus hardening of the helical compression springs is prevented.

Other objects, advantages and novel features of the present invention will become apparent from the following detailed description of one or more preferred embodiments when considered in conjunction with the accompanying drawing.

BRIEF DESCRIPTION OF THE DRAWING

The FIGURE is a top view of a schematically represented dual-mass flywheel according to an embodiment of the present invention.

DETAILED DESCRIPTION OF THE DRAWING

The dual-mass flywheel 1 as shown in the FIGURE includes a first mass body 2 and, rotatable relative to it, a second mass body 3. Between the first mass body 2 and the second mass body 3, a receiving chamber 4 is provided for receiving a helical compression spring 5 extending in the shape of an arc (curved).

The helical compression spring 5 disposed in a first receiving chamber 6 is supported directly on a contact surface 9 formed on the second mass body 3, that is, without the interposition of a wire cushion counterbearing body. This representation was chosen here in order to show that wire cushion counterbearing bodies are not necessarily provided at all the contact surfaces of the dual-mass flywheel.

Although the spring end 10 of the helical compression spring 5 in the first receiving chamber 6 is represented at a distance from the contact surface 9 of the second mass body 3, there can also be direct contact there.

The curved helical compression spring 5 provided in the first receiving chamber 6 is supported on a wire cushion counterbearing body 12 by the opposing spring end 11, and the wire cushion counterbearing body 12 is supported at its side opposite the spring end 11 on a contact surface 13 of the first mass body 2.

By interposing the wire cushion counterbearing body 12 between the spring end 11 and the contact surface 13, it is prevented in case of overload that the spring end 11 can dig into the contact surface 13 and damage it.

The helical compression spring 5 disposed in the second receiving chamber 7 is in turn supported directly on a contact surface 14 of the second mass body 3. At the opposite spring end 15 of the helical compression spring 5 in the second receiving chamber 7, a wire cushion counterbearing body 12 is fixed directly on the spring end 15 and in fact with a spacing from a contact surface 16 of the first mass body 2. Due to this one achieves the ability to rotate through an angle of rotation before the wire cushion counterbearing body 12 comes into contact with the contact surface 16. This ability corresponds to the spacing difference between the contact surface 16 and the contact surface which is on the wire cushion counterbearing body 12 and which corresponds to the contact surface 16.

In the third receiving chamber 8, a helical compression spring 5 is also provided. This can in turn come into contact directly with a contact surface 17 of the first mass body 2, although this is the case merely in the chosen representation. In an analogous manner a wire cushion counterbearing body can also be provided on the spring end 18 which is on the helical compression spring 5 in the third receiving chamber 8 and lies opposite the contact surface 17.

On the contact surface 19 which is on the second mass body 3 and lies opposite the spring end 18, a wire cushion counterbearing body 12 is in turn provided and is in fact attached directly to the contact surface 19. Here the wire cushion counterbearing body 12 stands at a distance from the spring end 20 so that a corresponding change in the angle of rotation between the first mass body 2 and the second mass body 3 is possible before they abut one another.

Now if the represented dual-mass flywheel 1 is subjected to a high angular velocity, then the helical compression spring 5 is pressed with great force against the wall 21 of the receiving chamber 4. In order to prevent the helical compression spring 5 from being pressed against the wall 21 with such force that a spring movement of the helical compression spring 5 is no longer possible, wire cushion bodies 22 are provided between the helical compression springs 5 and the wall 21 of the dual-mass flywheel 1. The wire cushion bodies prevent any direct contact between the helical compression springs 5 and the wall 21. The wire cushion bodies are friction reducing sliding components, and abut the wall 21 and the helical compression spring 5 under a centrifugal force load.

Along with this, the drawing shows in the second receiving chamber 7 a wire cushion body 22 extending along a part of the length of the helical compression spring 5 provided there. This is provided as an elongated insert between the wall 21 and the helical compression spring 5. Now if the helical compression spring 5 executes a spring movement, then the wire cushion body 22 is entrained in that spring movement in the direction of the arc of the helical compression spring 5. The helical compression spring 5 can thus move as a spring essentially freely.

In the first receiving chamber 6, a helical compression spring 5 is disposed together with a wire cushion counterbearing body 12 in a wire cushion body 23, which, as a mantle, completely covers or envelopes the helical compression spring 5 and the wire cushion counterbearing body 12.

Such a configuration of a wire cushion body formed as a mantle can, for example, also be provided in the third receiving chamber 8 or in all the receiving chambers of the dual-mass flywheel 1. Here, the wire cushion body 23 is formed so that it exerts a spring action in the radial direction, i.e., in the direction towards the wall 21, as well as in the longitudinal direction of the helical compression spring 5.

If the wire cushion body 23 is in the form of a mantle, then in its area of contact with the helical compression spring the wire cushion body has a toroidal contour which has the advantage that the wire cushion body centers itself automatically on the helical compression spring and thus can be dispensed with in the fastening to the housing walls of the dual-mass flywheel.

According to an extension of the invention, it is provided that the wire cushion body includes, in the area of one end facing a contact surface, a wire cushion counterbearing body 30 formed as one piece with the wire cushion body 12 or disposed thereon. The wire cushion counterbearing body 30 is provided between one spring end of the helical compression spring and the contact surface 16. An introduction of spring force into the contact surface takes place via the wire cushion counterbearing body 30.

The wire cushion counterbearing body can therefore, for example, be inlaid at the end of the wire cushion body or also can be formed together with the wire cushion body during the manufacture of the wire cushion body. The wire cushion counterbearing body then leads to a reduction of wear of the contact surface on the dual-mass flywheel and thus to an extension of the service lifetime of the dual-mass flywheel.

It is also possible in this way to reduce the contact surface since the wire cushion body, unlike the spring end of the helical compression spring, lies over the surface of the contact surface and thus the contact pressure per unit area of the contact surface is reduced. This can also be utilized to reduce the contact surface, whereby a reduction of the dimensions of the components is made possible and thus an advantage in weight is achieved.

The wire cushion counterbearing body can also be provided at a distance from the spring end or from the contact surface so that initially a relatively free mobility of the helical compression springs is achieved and only after a predetermined excursion of the spring is contact between the spring end of the helical compression spring and the wire cushion counterbearing body reached. In general, an improved insulation against vibration can be achieved with the wire cushion counterbearing body between the spring end and the contact surface and thus an improvement of the acoustic behavior of the dual-mass flywheel according to the invention with respect to the known dual-mass flywheel.

According to an extension of the invention, it is provided that the wire cushion body is formed by at least two wire cushion segment bodies 32,34 which are disposed functionally in a row or in parallel.

Through the connection in a row a soft configuration of the wire cushion body is achieved while through the connection in parallel a wire cushion body can be formed which has a spring characteristic with greater rigidity and thus a harder wire cushion body, depending on which configuration is desired for a given application.

According to an extension of the invention, it is also provided that the wire cushion body is formed along its direction of action with a linear or progressively or regressively variable spring rate. Such a configuration with a variable spring rate can, for example, be achieved in the manufacture of the wire cushion body by forming the wire cushion body with a predetermined number of cavities 36, which leads to the number of cavities corresponding to a softer or harder configuration. A progressive spring rate can, for example, be of advantage when, depending on the spring excursion of the wire cushion body, flexible behavior is desired initially in order to achieve, after a predetermined spring excursion, an increase of the spring characteristic and thus a harder behavior of the wire cushion body.

The wire cushion body 12 can be formed of metallic, ceramic, or vitreous materials, of polymers, or of mixtures thereof. Also, the wire cushion body can be formed of metallic materials of different hardness. With this a configuration is made possible in which the wire cushion body has a first contact area of a soft metallic material which is then followed by a second contact area of a harder metallic material, whereby, for example, a configuration deviating from a linear spring rate is possible.

The wire cushion body provided according to the invention in the dual-mass flywheel can have cavities 38 in which a lubricant is embedded. It can also have embedded solid lubricant parts, each of which provides that the friction between the wire cushion body and the wall of the dual-mass flywheel remains low and thus hardening of the helical compression springs is prevented.

The exemplary dual-mass flywheel is distinguished by the fact that it has outstanding tribological properties during its entire service lifetime and a clearly higher resistance to wear than the known dual-mass flywheel described above. In addition, a clear cost reduction advantage is obtained since it is possible to omit the sliding components which are part of the known dual-mass flywheel and are made of plastic.

| Table of Reference Numerals | |
|---|---|
| 1 | Dual-mass flywheel |
| 2 | First mass body |
| 3 | Second mass body |
| 4 | Receiving chamber |
| 5 | Helical compression spring |
| 6 | First receiving chamber |
| 7 | Second receiving chamber |
| 8 | Third receiving chamber |
| 9 | Contact surface |
| 10 | Spring end |
| 11 | Spring end |
| 12 | Wire cushion counterbearing body |
| 13 | Contact surface |
| 14 | Contact surface |
| 15 | Spring end |
| 16 | Contact surface |
| 17 | Contact surface |
| 18 | Spring end |
| 19 | Contact surface |
| 20 | Spring end |
| 21 | Wall |
| 22 | Wire cushion body |
| 23 | Wire cushion body |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A dual-mass flywheel, comprising:
a first mass body;
a second mass body;
a damping device disposed between the first mass body and the second mass body, the first mass body and the second mass body being rotatable relative to one another by way of the damping device;
wherein the damping device comprises at least one helical compression spring, extending in an arc shape, for introducing spring force into the first and second mass bodies via contact surfaces formed thereon, the helical compression spring being guided in a radial direction by a wall formed by one mass body; and
a wire cushion body interposed between the wall and the helical compression spring, the wire cushion body being a friction-reducing sliding component operatively configured to abut the wall and the helical compression spring under a centrifugal force load.

2. The dual-mass flywheel according to claim 1, wherein the wire cushion body is operatively configured to be elastic in at least one of a longitudinal and radial direction of the helical compression spring.

3. The dual-mass flywheel according to claim 2, wherein the wire cushion body is operatively disposed as an elongated insert between at least one partial area of a length of the helical compression spring and the wall.

4. The dual-mass flywheel according to claim 2, wherein the wire cushion body is operatively configured as a mantle for enveloping the helical compression spring at least along a partial area of a length of the helical compression spring.

5. The dual-mass flywheel according to claim 1, wherein the wire cushion body is operatively disposed as an elongated insert between at least one partial area of a length of the helical compression spring and the wall.

6. The dual-mass flywheel according to claim 1, wherein the wire cushion body is operatively configured as a mantle for enveloping the helical compression spring at least along a partial area of a length of the helical compression spring.

7. The dual-mass flywheel according to claim 1, wherein the wire cushion body comprises in an area of one end facing a contact surface a wire cushion counterbearing body, said wire cushion counterbearing body being provided between one spring end of the helical compression spring and the contact surface, whereby an introduction of spring force into the contact surface takes place via the wire cushion counterbearing body.

8. The dual-mass flywheel according to claim 7, wherein the wire cushion counterbearing body is one of: (a) formed in one-piece with the wire cushion body, and (b) disposed on the wire cushion body.

9. The dual-mass flywheel according to claim 7, wherein the wire cushion counterbearing body is operatively arranged at a distance from the one spring end or the contact surface.

10. The dual-mass flywheel according to claim 1, wherein the wire cushion body comprises at least two wire cushion body segments functionally disposed in either a row or in parallel.

11. The dual-mass flywheel according to claim 1, wherein the wire cushion body is operatively configured with one of a linear, progressive, and regressive variable spring rate along a direction of action.

12. The dual-mass flywheel according to claim 1, wherein the wire cushion body is operatively configured with areas of different density along a direction of action.

13. The dual-mass flywheel according to claim 1, wherein the wire cushion body is formed of one of metallic material, ceramic material, vitreous material, polymer material, and mixtures of said materials.

14. The dual-mass flywheel according to claim 1, wherein the wire cushion body is formed of metallic materials having different hardness.

15. The dual-mass flywheel according to claim 1, wherein the wire cushion body includes cavities in which a lubricant is embeddable.

16. The dual-mass flywheel according to claim 1, wherein the wire cushion body comprises embedded solid lubricant components.

\* \* \* \* \*